United States Patent [19]
DuCharme, Jr. et al.

[11] Patent Number: 6,096,258
[45] Date of Patent: Aug. 1, 2000

[54] METHOD AND APPARATUS FOR FORMING A CELLULOSE ARTICLE INCLUDING SOLVENT RECOVERY MEANS

[75] Inventors: Paul Edmund DuCharme, Jr., Tinley Park; Edward Makoto Kajiwara, Park Ridge; Norman Abbye Portnoy, Bolling Brook, all of Ill.

[73] Assignee: Viskase Corporation, Chicago, Ill.

[21] Appl. No.: 09/009,505

[22] Filed: Jan. 20, 1998

[51] Int. Cl.[7] .................................................. B29C 47/00
[52] U.S. Cl. .................... 264/561; 264/37.2; 264/179; 264/194; 264/195; 264/203; 264/211.13; 264/211.19; 264/233; 264/560; 264/562
[58] Field of Search .................... 264/37.2, 37.26, 264/560, 565, 569, 179, 183, 186, 194, 195, 203, 233, 211.13, 211.19, 561, 562, 187, 211.15

[56] References Cited

U.S. PATENT DOCUMENTS

| | | | |
|---|---|---|---|
| 2,999,757 | 9/1961 | Shiner et al. | 99/176 |
| 3,617,200 | 11/1971 | Gilder . | |
| 5,118,423 | 6/1992 | Astegger et al. | 210/638 |
| 5,216,144 | 6/1993 | Eichinger et al. | 536/56 |
| 5,277,857 | 1/1994 | Nicholson et al. | 264/187 |
| 5,403,503 | 4/1995 | Taylor | 264/187 |
| 5,403,530 | 4/1995 | Taylor . | |
| 5,451,364 | 9/1995 | DuCharme, Jr. et al. . | |
| 5,597,587 | 1/1997 | Nicholson et al. . | |
| 5,628,941 | 5/1997 | Kalt et al. | 264/38 |
| 5,658,524 | 8/1997 | Portnoy et al. . | |
| 5,658,525 | 8/1997 | Kajiwara et al. . | |
| 5,702,783 | 12/1997 | Nicholson et al. . | |
| 5,759,478 | 6/1998 | Kajiwara et al. . | |
| 5,766,540 | 6/1998 | Kajiwara et al. . | |
| 5,942,167 | 8/1999 | DuCharme, Jr. . | |

FOREIGN PATENT DOCUMENTS

| | | |
|---|---|---|
| 0 634 101 | 1/1994 | European Pat. Off. . |
| 0 756 825 | 2/1997 | European Pat. Off. . |
| 25 26 289 | 12/1976 | Germany . |
| WO 93/11287 | 6/1993 | WIPO . |

*Primary Examiner*—Jan H. Silbaugh
*Assistant Examiner*—Mark Eashoo
*Attorney, Agent, or Firm*—Roger Aceto

[57] ABSTRACT

A method and apparatus is disclosed for forming a cellulose film suitable for direct food contact by precipitation from a solution of cellulose water and a tertiary amine oxide cellulose solvent. After precipitation of a cellulose gel from the solution, the gel is washed at ever increasing temperatures and then dried to provide a cellulose film having a solvent level to not more than 40 ppm. Portions of the wash water is collected and treated to recover the solvent for reuse.

14 Claims, 1 Drawing Sheet

METHOD AND APPARATUS FOR FORMING A CELLULOSE ARTICLE INCLUDING SOLVENT RECOVERY MEANS

TECHNICAL FIELD

The present invention relates to the production of cellulose tubes and films suitable for direct food contact using a cellulose dissolution process and to the recovery of the cellulose solvent for reuse in the process.

BACKGROUND OF THE INVENTION

The manufacture of seamless cellulose tubes for sausage casings using cellulose derived by the so-called "viscous process" is well known in the art. Briefly, in the viscose process, a natural cellulose such as cotton linters or wood pulp is reacted chemically to form a cellulose derivative (cellulose xanthate) which is soluble in a weak caustic solution. The solution or "viscose" is extruded as a tube into an acid bath. The extruded viscose reacts chemically with the acid bath resulting in the regeneration and coagulation of a pure cellulose tube. The chemical reaction produces several undesirable by-products including hydrogen sulfide and carbon disulfide.

More recently, a process of direct cellulose dissolution has been adapted to the manufacture of cellulose food casings. In this process no cellulose derivative is formed so the chemical reactions required first to form a cellulose derivative and then to regenerate the cellulose from the derivative have been eliminated. Instead, a natural cellulose is put directly into solution with the use of a tertiary amine oxide cellulose solvent such as N-methylmorpholine-N-oxide (NMMO). The resulting solution is thermoplastic in that it hardens upon cooling and flows on reheating. The solution, when molten, can be extruded as a tube or film into a water bath.

Upon contact with the water bath, the NMMO solvent is extracted so that a regeneration of the cellulose solution occurs. Thus, use of NMMO as a solvent for cellulose eliminates the need for derivatizing the cellulose, as in the viscose process. This avoids certain disadvantages of the viscose process such as the generation of gaseous sulfur compounds during the regeneration process. Moreover, the solvent is recoverable so it can be reused for cellulose dissolution.

U.S. Pat. Nos. 2,179,181; 4,145,532; 4,426,228 and Canadian Patent No. 1,171,615 all deal with the formation of a cellulose solution using the NMMO solvent and subsequent-formation of cellulose articles such as films and filaments using the resulting solution. An apparatus and method for preparing an extrudable cellulose solution in a continuous process are disclosed in U.S. Pat. Nos. 5,094,690 and 5,330,567. In these patents, a suspension of cellulose in an aqueous solution of NMMO is fed into the top of a vessel having a heated wall. Within the vessel, a rotating wiper spreads the suspension across the heated wall and moves the suspension downward in the vessel. As the suspension moves downward, water is evaporated and the concentration of NMMO increases. Eventually, the temperature of the suspension and the concentration of NMMO reaches a level where the cellulose is dissolved so that a cellulose solution flows from the bottom of the vessel.

U.S. Pat. Nos. 5,277,857; 5,451,364 and 5,597,587 disclose a tubular extrusion method and apparatus utilizing the thermoplastic cellulose solution for purposes of making tubular films. Such films, for example, may be used as sausage casings.

As disclosed in these patents, the cellulose solution is extruded through an annular die and into a bath of nonsolvent liquid. Upon contact with the bath liquid, the cellulose solvent is extracted which causes the cellulose in the solution to be precipitated or "regenerated" in the form of a cellulose hydrate or "gel". The tube of cellulose gel is washed to remove residual solvent, plasticized and then dried to produce the tubular film of pure cellulose.

Due to economic factors, it is essential to recover for reuse, as much of the cellulose solvent as possible. For this reason, the aqueous solution from the precipitation bath and wash water is treated to evaporate or separate out the water in order to concentrate and recover the solvent.

In the production of tubular films, the process parameters which are found to produce desirable film characteristics are often compromised by process parameters for precipitating or regenerating the cellulose as fast as possible and for recovering the solvent.

For example, for purposes of rapid cellulose regeneration, a precipitation bath of hot water is preferred. With just water in the precipitation bath, solvent is extracted faster and a hot bath further accelerates extraction. However, due to the economics of solvent recovery, it is preferred to maintain the bath at a high solvent concentration. For example, at a solvent concentration of 5 to 30%, the bath still is considered a nonsolvent liquid for purposes of precipitating the cellulose but this concentration has the advantage of facilitating solvent recovery.

A second consideration for the precipitation bath is temperature. Generally a high temperature will accelerate the rate of cellulose precipitation by speeding the rate at which solvent is extracted from the solution. However, it has been found that desirable film properties are enhanced if the thermoplastic solution is extruded into a cool precipitation bath. It is possible the cool precipitation bath may promote the formation of a liquid crystal structure which improves the strength of the resulting film. The effect of the temperature of the precipitation bath on the properties of a tubular film are further set out in U.S. Pat. Nos. 5,658,525 and 5,658,524. Thus, conflicting desires of the economic solvent recovery and a strong film dictate that the precipitation bath be maintained at a solvent concentration of 10 to 25 to % and that the precipitated bath be relatively cold with a temperature of 0 to 8° C. being preferred.

With the precipitation bath being maintained at a solvent concentration of 10 to 25%, not all of the solvent contained by the extruded solution is removed in the precipitation bath so that the regenerated cellulose gel contains an amount of recoverable solvent. Consequently, the film, while still in its gel state, is washed to strip out as much of the solvent as economically possible from the film. This adds to the economy of the method in that the solvent extracted can be recycled into the system to dissolve the natural cellulose for extrusion.

The washing conditions also may affect the characteristics of the resulting film. In particular, it has been found that subjecting the regenerated cellulose gel to a drastic temperature change adversely affects film properties. Thus, while washing the cellulose gel with hot water to speed solvent extraction is preferred, the cool cellulose gel leaving the precipitation bath should not be immediately exposed to hot wash water. Moreover, if the cellulose film is to be used for food contact applications, it is essential to reduce the residual solvent content of the film to levels well below any economic recovery level of the solvent and preferably to not more than 40 ppm. Thus, still further treatments of the cellulose gel are needed to satisfy governmental regulations for its use in food contact applications.

Accordingly, it is an object of the present invention to provide a process for regenerating a cellulose film from a solution of cellulose, a cellulose solvent and water including recovery of the cellulose solvent for reuse.

Another object is to provide such a process for regenerating a cellulose film which is suitable for direct food contact in that the level of solvent remaining in the film when ready for use is not more than 40 ppm on a dry cellulose basis.

A further object is to provide such a process wherein the regenerated cellulose gel is contacted with wash water at increasing temperatures to reduce the solvent levels in the regenerated cellulose gel to not more than 40 ppm.

SUMMARY OF THE INVENTION

In accordance with the present invention, the starting material is a cellulose solution comprising a natural cellulose which has been subject to a direct dissolution by a solvent comprising an aqueous solution of an amine oxide. Processes for such dissolution using an aqueous solution of N-methylmorpholine-N-oxide (NMMO) are known in the art and form no part of the present invention. The product of such a dissolution process is an extrudable solution having a melting temperature of about 60–70° C. and comprising 10–20% cellulose, 70–80% NMMO and 5–15% water.

The cellulose solution is characterized hereafter as being a nonderivatized cellulose solution. For purposes of this specification, the term "nonderivatized" cellulose means a cellulose which has not been subjected to covalent bonding with a solvent or reagent but which has been dissolved by association with a solvent or reagent through Van der Waals forces such as hydrogen bonding.

The cellulose solution, which has a melting temperature of about 65° C., is extruded through an annular die and about a mandrel which depends from the die. Suitable extrusion methods and apparatus for such extrusion are disclosed in U.S. Pat. Nos. 5,277,857; 5,451,364 and in U.S. Ser. Nos. 08/827,130 and 08/827,152, the disclosures of which are incorporated herein by reference.

Briefly, and as disclosed in the above referenced patents, extrusion from the die is downward through an air gap and into a bath of nonsolvent liquid. "Nonsolvent" as used herein means a liquid which is not a cellulose solvent such as demineralized water or a nonsolvent concentration of NMMO in water. In the bath, the NMMO is extracted from the extruded tube thereby coagulating and regenerating the nonderivatized cellulose to form a tube composed of a cellulose gel. The gel tube is washed to remove residual NMMO solvent. Then it is plasticized with a polyol such as glycerine and dried to form a tubular film.

For purposes of economy in the recovery of solvent, the precipitation bath is maintained at a solvent concentration of about 5 to 30% with 10 to 20% being preferred. The solvent extracted from the extruded solution tends to raise this concentration so there is a steady introduction of water into the bath and a steady removal of liquid from the bath to maintain this concentration. Also, the temperature of the bath is maintained between 0° and 20° C. and preferably below 10° C. It has been found that these cool temperatures enhance desirable film properties such as tensile strength and, in the case of tubular films, burst pressure. Burst pressure is the internal pressure required to burst a wet tubular film. Usually this is determined by filling the tube with water and then increasing the water pressure until the tube bursts. The diameter of the tube at burst (burst diameter) and the amount of stretch of the film to the burst diameter are other desirable properties. Also, U.S. Pat. No. 5,216,144 mentions that for fiber production, a precipitation bath of 0° C. allows operation at a higher solvent concentration in the bath without detriment to fiber characteristics.

The extruded solution initially is composed of about 75% solvent. In the precipitation bath, this is reduced to about 45%. At this solvent level, the cellulose in the extruded tube is precipitated to form a self-supporting film of a hydrated cellulose gel.

After the precipitation bath, the cellulose gel is transported through a washing operation to remove as much of the retained 45% solvent as is economically possible. It is preferred to wash this retained solvent from the gel by using a hot (35 to 70° C.) demineralized water in order to accomplish the extraction as fast as possible. However, moving the cool cellulose gel from the cold (0 to 20° C.) precipitation bath directly into contact with hot wash water compromises physical properties of the resulting film. For example, in a tubular film, the work limits of the casing, as represented by multiplying the burst pressure of the tubular film times its diameter at the instant of burst, may be reduced if the temperature differential between the precipitation bath and the wash water is much more than about 5 to 15° C. Consequently, it has been found that washing solvent from the film of cellulose gel should be done by initially contacting the gel with a cool wash water and then gradually increasing the wash water temperature up to about 35 to 50° C.

While it is desirable to wash out as much of the NMMO cellulose solvent as possible, it should be appreciated that there are limits to the amount of solvent which can be economically recovered. For example, at least 95% must be recovered in order to economically justify use of the direct dissolution system for making a cellulose film with the limit of economic recovery being not more than about 99.98%. Thus, the washing step should reduce the solvent content of the gel to at least about 250,000 ppm based on the weight of dry cellulose (95% solvent recovery) and preferably to about 1000 to 2000 ppm (99.98 to 99.96% solvent recovery). Attempting to reduce the solvent level below 1000 to 2000 ppm, generally is no longer economical in terms of solvent recovery. In other words, below about 1000 to 2000 ppm there is so little solvent in the cellulose gel that it no longer is economical to process the wash water to recover the solvent.

While a film containing 1000 to 2000 ppm of the cellulose solvent is suitable for some applications, it does not have U.S. government approval for direct food contact. The maximum solvent level for use as a direct food contacting film, such as a sausage casing, is 40 ppm based on the weight of dry cellulose. Accordingly, after the first washing, the cellulose gel must be subjected to a second washing to provide a film having a solvent level which is not more than 40 ppm based on the weight of dry cellulose. Since the solvent level is not more than about 1000 to 2000 ppm after the first washing, the cellulose gel can be exposed to hotter temperatures to facilitate the stripping out of the solvent to acceptable levels without compromising desirable film properties. Thus, the second wash is about 50° C. and preferably 60° C. or higher. Whereas liquid from the precipitation bath and first wash are processed to recover the solvent, the wash water from the second washing operation can be discarded without need for further treatment.

It is preferred that the second washing reduce the solvent content of the cellulose gel to not more than 40 ppm.

However, after washing, the cellulose gel is dried and the process of drying can possibly drive out some portion of the solvent. Accordingly, it may be sufficient if the second washing reduces the solvent content to 100 to 150 ppm. What is important is that after drying, the solvent content of the cellulose film for use in direct food contact should be no more than 40 ppm.

Accordingly, the present invention may be characterized in one aspect thereof by a process including the forming of a cellulose film suitable for direct food contact from a solution of cellulose, a tertiary amine cellulose solvent and water together with recovering the solvent, comprising the steps of:

a) extruding a solution of 10 to 20% cellulose, 70 to 80% solvent and 5 to 15% water in the shape of a tube or film into an aqueous first bath and in the bath, extracting solvent from the solution for precipitating a cellulose gel in the form of a tube or film which contains not more than about 45% solvent;

b) maintaining the-temperature of the aqueous first bath between 0 and 20° C. and the solvent concentration of the bath at between 5 and 30% during the course of extracting solvent from the extruded solution;

c) subjecting the tube or film of cellulose gel from the aqueous first bath to a first washing with water for extracting solvent from the cellulose gel, the first washing being conducted by countercurrent flowing wash water relative to the passage of the tube or film and the temperature of the first washing being not more than about 5 to 10° C. higher than the aqueous first bath where the cellulose gel first contacts the countercurrent flow and between about 35 and 70° C. where the cellulose gel last contacts the countercurrent flow;

d) subjecting the tube or film of cellulose gel from the first washing to a second washing of hot water maintained at a temperature above the hottest temperature of the first washing and maintaining the cellulose gel in contact with the second washing for a time sufficient to further reduce the solvent content of the cellulose gel;

e) drying the cellulose gel to provide a cellulose film or tube having a solvent content of not more than 40 ppm based on the weight of dry cellulose; and f) treating liquid from the aqueous first bath and the first washing to recover solvent in these liquids.

In another aspect, the present invention is characterized by an apparatus for forming a cellulose film suitable for direct food contact from a cellulose solution including recovery of solvent for reuse comprising:

a) means for extruding a tube or film composed of a thermoplastic cellulose solution of 10 to 20% cellulose, 5 to 15% water and 70 to 80% tertiary amine oxide cellulose solvent;

b) an aqueous first bath for receiving the extrusion of step (a) and extracting from the extrusion an amount of the solvent sufficient to cause the precipitation of cellulose from the solution and form a tube or film of a hydrated cellulose gel containing not more than about 45% of the solvent;

c) means for maintaining the aqueous first bath at a temperature of 0 to 20° C. and at a solvent concentration of 5 to 30%;

d) a second bath of heated demineralized water for rinsing solvent from the cellulose gel to reduce the solvent content of the cellulose gel to 1000 to 2000 ppm based on dry cellulose, the water of the second bath moving countercurrent to the passage of the cellulose gel through the second bath wherein the second bath has an amine oxide rich effluent;

e) means for maintaining the temperature of water entering the second bath at about 35 to 50° C. and the temperature of water leaving the second bath at about 12 to 16° C.;

f) a tub for receiving the cellulose gel from the second bath the tub containing hot wash water for washing the cellulose gel and further reducing the total solvent content of the cellulose gel, the temperature of the water in the tub being greater than the temperature of the water entering the second bath;

g) means for drying the cellulose gel passing from the tub to provide a cellulose film having a solvent content of not more than 40 ppm based on the weight of dry cellulose; and h) means for treating the second bath effluent to recover the amine oxide contained in the effluent.

DESCRIPTION OF THE DRAWINGS

The sole FIGURE is a view showing in schematic fashion steps of a process for extruding tubular films and solvent recovery.

DETAILED DESCRIPTION OF THE INVENTION

Figure 1:
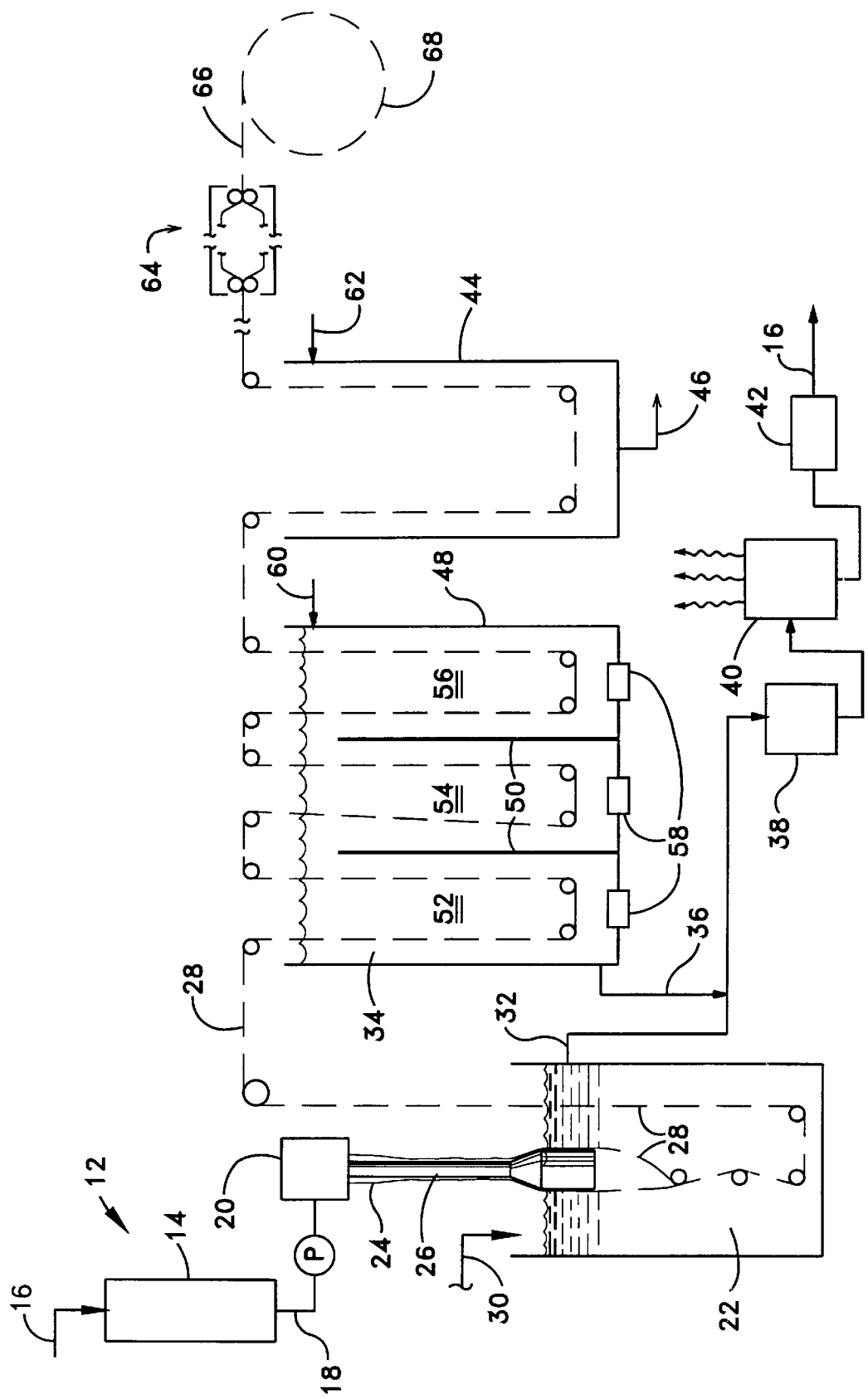

Referring to the drawings, FIG. 1 shows a schematic representation of a tubular extrusion system for the production of tubular films of regenerated cellulose of the type as may be used for sausage casings or the like. Briefly, the system includes apparatus generally indicated at 12 for solubilizing a natural cellulose. For example, the apparatus can be the type as described in U.S. Pat. Nos. 5,094,690 and 5,330,567 as referred to hereinabove. In this apparatus, a mixture of natural cellulose, water and an amine oxide cellulose solvent such as NMMO introduced into the top of a heated vessel 14 through an inlet 16 is converted to a cellulose solution, hereafter referred to as "dope", which is forced from a bottom outlet 18. The cellulose solution or "dope" is thermoplastic in that it is a solid at room temperature and has a melting point of about 65° C.

The dope produced in vessel 14 is pumped to an extrusion die 20 arranged for extruding the dope downwardly into a first bath 22. For purposes of tubular extrusion, the die 20 is annular and the resulting tubular extrusion 24 passes over a mandrel 26 which bridges the air space between the die and the regenerating bath. The mandrel forms no part of the present invention and reference is made to U.S. Pat. Nos. 5,277,857; 5,451,364 and to Ser. Nos. 08/827,130 and 08/827,152 for a more detailed account of the operation and function of the mandrel structure.

In the first bath, the amine solvent is extracted from the extruded tube so as to coagulate and regenerate the cellulose from the solution to form a seamless tube 28 of a hydrated cellulose gel. From the standpoint of process speed, it would be preferred to extract as much of the solvent as possible from the extruded tube in the first bath 22 and to do this as quickly as possible. The conditions favorable to this end include the use of hot water in the bath.

However, in order to economically recover solvent for reuse, the concentration in the bath 22 preferably is kept at some higher level and in the range of 5 to 30% with 10 to 20% being a preferred range.

At this concentration, the bath still is considered a non-solvent and permits the extraction of enough solvent from the extruded solution 24 to cause the coagulation and regeneration of the cellulose from the solution and produce the tube 28 of hydrated cellulose gel. The desired concentration in the first bath may be maintained, for example, by introducing fresh demineralized water into the bath through a pipe 30 as needed while continuously withdrawing the aqueous solvent solution from the bath from an overflow and out through flow line 32.

It also has been found that with the solvent concentration in the bath being in the range of 10 to 20%, desirable film properties are enhanced by keeping the first bath 22 relatively cool, preferably below 10° C. For example, it is believed that the cooler temperatures slow the solvent extraction rate so the cellulose gel which is regenerated is more dense than if regenerated at a higher temperature.

In the first bath 22, the cellulose solvent content of the extruded solution 24 is decreased to about 45%. While this concentration allows for the precipitation and regeneration of cellulose, the resulting cellulose gel tube 28 still contains a considerable amount of solvent which must be removed. For this purpose the cellulose gel tube 28 is transported to a second bath 34 to remove as much of the amine solvent as is economically possible. A wash to reduce the solvent content of the gel tube 20 to about 1000 to 2000 ppm based on the dry weight of cellulose in effect has the potential to recover 99% or more of the solvent contained in the initial extrusion 24.

As noted above, washing the tube 28 of cellulose gel with hot water facilitates the extraction of solvent. Hot water causes the regenerated cellulose structure to collapse which helps to force solvent from within the cellulose structure. However, it has been found that the tube 28 of cellulose gel which is relatively cold when it leaves the regenerating bath cannot be immediately subjected to a hot water wash. To do this causes the resulting film to become cloudy and compromises both tensile strength and burst pressure. One possible explanation is that contacting the cold regenerated cellulose gel with hot water causes such a rapid extraction of solvent that voids are created in the structure of the film which weaken the cellulose structure. The cloudiness of the film may also be caused by such voids. However, whatever the cause, it has been found that contacting the regenerated cellulose gel from the first bath 22 immediately with a hot water wash is not desirable. Accordingly, it has been found that desirable film properties can be obtained if the tube 28 of cellulose gel is exposed to a gradually increasing water temperature. In this way, it is the cellulose gel which contains the least solvent which is exposed to the hottest water. Thus, washing the tube 28 of cellulose gel with water which gradually increases in temperature has been found to obtain the benefits of extracting the solvent in a manner which produces a dense substantially solvent free cellulose structure.

To accomplish exposure to increasingly hotter wash water, the flow through the second bath 34 preferably is countercurrent to the passage of the tube 28. This countercurrent wash should reduce the amine content of the tube 28 down to at least 250,000 and preferably to about 1000 to 2000 ppm. Wash water which leaves the second bath 34 through a drain 36 is amine rich and has a concentration of about 6 to 8% of the amine cellulose solvent. This amine rich wash water subsequently is combined with the aqueous solvent solution from the first bath 22 and the mixture then is treated to recover the solvent. Such treatment may involve contact with successive anion and cation exchangers 38 to remove ions which may have been generated during the dope making, extrusion and cellulose regenerating processes.

The purified mixture then is treated by any suitable means 40 such as reverse osmosis or evaporation to concentrate the amine oxide cellulose solvent (NMMO). The recovered concentrated cellulose solvent then is fed back to the system for purposes of solubilizing the cellulose and making the dope to be extruded. For example, the recovered solvent can be fed to a mixer 42 where it is mixed with a natural cellulose pulp and water to form a suspension which is fed through inlet 16 to the vessel 14.

The countercurrent wash in the second bath 34 can be accomplished in a cascade system. In such a system, the casing would move upward through a tilted trough while treated water introduced at the high end flows downwardly. In a preferred arrangement as shown in the FIGURE, cellulose tube 28 is festooned through a tub 48. The tub is vertically divided by internal walls 50 into a plurality of cells, such as the three cells 52, 54 and 56 as shown. While three cells are illustrated, it should be appreciated that any number can be used within the context of the present invention.

There is communication between cells to accommodate the flow of wash water from the last cell 56 to the first cell 52. In addition, the water temperature in each cell can be individually controlled by any suitable heating/cooling means 58.

With this arrangement, heated demineralized wash water entering the last cell 56 through inlet 60, fills and then flows through the cells to the outlet 36 in the first cell 52.

The temperature of the wash water entering the last cell 56 is in the range of 45 to 70° C. and preferably is no more than about 50 to 60° C. The temperature of wash water in the second cell 54 is cooler and the temperature in the first cell 52 is coolest. The temperature in the first cell 52 generally is not more than about 5 to 10° C. warmer than the first bath 22 and preferably is 12 to 16° C. Thus, the countercurrent washing creates a plurality of temperature zones wherein each succeeding zone contacted by the tube 28 of cellulose gel is higher than the preceding zone.

In the countercurrent wash, the solvent concentration of the cellulose tube is reduced to about 1000 to 2000 ppm and the solvent concentration in the wash water is increased to about 6 to 8%. At this level, the wash water from drain 36 can be mixed with liquid from the overflow drain 32 of the first bath 22 and treated to recover the solvent. As an alternative, at least some of the wash water from the tub drain 36 can be fed directly into the first bath 22 to help maintain the desired solvent concentration. If this is done, it may not be necessary to add fresh demineralized water from outlet 30 to the bath 22.

As noted above, the cellulose tube 28 which contains a solvent level of as low as 1000 to 2000 ppm as it leaves the second bath 34 is not acceptable for direct food contact. Accordingly, the tube must be washed a second time. The second wash preferably is accomplished by festooning the tube through a wash tub 44 which permits sufficient residence time to strip the solvent level down to below 1000 ppm and preferably to not more than 40 ppm. Stripping to this level is facilitated by using water at a temperature higher than the water in the bath 34. Thus, the water entering the wash tub through line 62 can be 60–70° C. or higher. Since the wash water effluent from the wash tub 44 contains a level of solvent which is too low to recover economically, it simply is discarded through a drain 46 without further treatment.

Upon leaving the second washing in tub 44, the tube of cellulose gel can be contacted with a glycerine solution (not shown) to add a plasticizer. This is conventional in the art. The tube 28 of cellulose gel then is dried to a moisture content of about 6% based on the weight of dry cellulose. This is accomplished by inflating the gel tube 28 and passing it through a drier indicated at 64. The dried cellulose film 66 then is collapsed to its flat width and wound on a reel 68. It has been found that drying the cellulose gel may drive off some solvent. The amount driven off by drying may vary depending upon conditions but generally if the solvent content is higher, a greater portion of solvent can be drawn off by drying than if the content is lower. For example, drying a cellulose gel containing 100 to 200 ppm of solvent may result in a cellulose film containing no more than 40 ppm of the solvent. Accordingly, for use in a food contacting application, the solvent content of the cellulose gel leaving the wash tub 44 may be higher than 40 ppm and still produce an acceptable film. Thus, for purposes of the present invention, it is sufficient if the second washing removes enough solvent so that after drying, the film contains not more than 40 ppm of solvent. In other words, the drying step and the second washing step must together remove enough solvent to bring the solvent level of the cellulose gel entering the washing tub 44 (about 1000 to 2000 ppm) down to not more than 40 ppm in the dried cellulose film 66.

The total residence time of the cellulose tube in both the second bath 34 and in the wash tub 44 and the temperature of the wash water are factors in determining the amount of solvent removed. It follows that the longer the residence time and the hotter the temperature the more solvent is removed. However, it has been found that the speed of the tube through the system also is important and that a faster speed is better than a slower speed. It is believed that a higher relative speed disrupts the boundary layer to improve the mass transfer of solvent out of the extruded tube. One option to increase this relative speed is to increase the flow of water in the countercurrent second bath 34. However, at some point this becomes impractical as the amount of water used to achieve a high flow rate leads to a decrease in the concentration of solvent contained in the wash water at drain 36. A second and preferred option is to increase the extrusion rate of the cellulose solution so the speed of the tube 28 through the system is increased. For example, with one size of tubular extrusion, it was found that speed is a controlling factor for solvent removal in almost all instances where the concentration of the first bath 22 is in the range of 12 to 20%, the temperature of the final wash in tub 44 is in the range of 64 to 71° C. and the total contact time of the extruded tube in the second bath 34 and wash tub 44 is between 12 to 30 minutes.

It should be appreciated that the majority of time spent washing the cellulose tube 28 is consumed by the stripping operation in tub 44 to reduce the solvent content to well below the 1000 to 2000 ppm level of the cellulose gel entering tub 44. For example, at a typical extrusion speed of about 30 to 31 meters per minute, the total residence time of the extruded tube 24 in the first bath 22 would be about 20 seconds. In the second bath 34, it only takes a residence time of about 2½ minutes to reach the 1000 to 2000 ppm limit of economic solvent recovery. The balance of the residence time, of about 15 to 20 minutes is required for the final wash in tub 44 to bring the solvent level in the tube 28 of cellulose gel down to the preferred 40 ppm or at least down to a level where the subsequent drying step will be able to drive off enough solvent to provide a dried film having no more than 40 ppm of solvent.

Thus, it should be appreciated that the present invention accomplishes its intended objects to provide a method and apparatus for producing a cellulose film suitable for direct food contact using a solvent process wherein the solvent content of the film is not more than 40 ppm based on the weight of dry cellulose. This is accomplished in part by contacting the extruded and regenerated cellulose gel with an initial countercurrent wash that increases in temperature and then with a second wash at an even higher temperature and then drying the film. Water from the first wash is treated to recover solvent to reuse thereby adding to the efficiency of the process. The second hot water wash performs a stripping operation to reduce the solvent levels to the point where such washing, together with the subsequent drying step, provides a cellulose film containing no more than 40 ppm of the solvent.

Having described the invention in detail what is claimed as new is:

1. A process for forming a nonderivatized cellulose film suitable for direct food contact from a thermoplastic solution of cellulose, water and a tertiary amine cellulose solvent including recovering the solvent for reuse, said process comprising the steps of:

a) extruding the solution comprising at least 70% solvent as a tube or film into an aqueous first bath, the first bath causing the extraction of sufficient solvent to precipitate a cellulose gel from the solution in the form of a tube or film which has a solvent content of less than 45% by weight of dry cellulose;

b) maintaining the aqueous first bath at a temperature of 0 to 20° C. and a solvent concentration of 5 to 30% during the course of extracting solvent from the extruded solution;

c) subjecting the tube or film of cellulose gel from the aqueous first bath to a first washing for extracting solvent from the cellulose gel, the first washing being conducted by flowing demineralized water countercurrent to the passage of the cellulose gel, the temperature of the water being not more than 5 to 10° C. higher than the temperature of the aqueous first bath where the cellulose gel first contacts the countercurrent flow of the first washing and between 35 and 70° C. where the cellulose gel last contacts the countercurrent flow of demineralized water;

d) subjecting the cellulose gel from the first washing to a second washing of hot water maintained at a temperature above the hottest temperature of the first washing and maintaining the cellulose gel in contact with the second washing for a time sufficient to further reduce the solvent content of the cellulose gel;

e) drying the cellulose gel to provide a cellulose film or tube having a solvent content of not more than 40 ppm based on the weight of dry cellulose; and f) treating liquid from the aqueous first bath first and washing to recover solvent in these liquids.

2. A process as in claim 1 comprising contacting the cellulose gel from the aqueous first bath with said countercurrent first washing in a plurality of successive temperature controlled washing zones and maintaining the temperature of each zone contacted by the cellulose gel higher than the temperature of the immediately preceding zone.

3. A process as in claim 2 wherein the temperature of the first washing zone contacted by the cellulose gel being 12 to 16° C. and the temperature of the last washing zone being 45 to 70° C.

4. A process as in claim 1 wherein the temperature of the aqueous first bath is about 7° C., the temperature of the water in said washing being about 15° C. where said countercurrent flow is first contacted by the cellulose gel and about 50° C. where it is last contacted by the cellulose gel.

5. A process as in claim 1 comprising subjecting said cellulose gel to said first washing for a time sufficient to reduce the total solvent content of the cellulose gel to at least 250,000 ppm based on the weight of dry cellulose.

6. A process as in claim 5 wherein the total solvent content of the cellulose gel is reduced to 1000 to 2000 ppm based on the weight of dry cellulose.

7. A process as in claim 1 wherein the total solvent content of the cellulose gel after said second washing is not more than 40 ppm.

8. A process as in claim 1 wherein the temperature of said second washing is about 60° C.

9. A process as in claim 1 wherein drying the cellulose gel provides a cellulose film or tube having a moisture content of about 6% based on the weight of dry cellulose.

10. A process for forming a cellulose film of nonderivatized cellulose suitable for direct food contact from a solution of cellulose, water and a tertiary amine oxide cellulose solvent and recovering the solvent for reuse comprising the steps of:
   a) extruding a solution of 10 to 20% cellulose, 5 to 15% water and 70 to 80% tertiary amine cellulose solvent in the form of a tube or film into an aqueous first bath and maintaining the extruded solution in the first bath for a time sufficient to extract solvent from the extruded solution and precipitate a hydrated cellulose gel in the form of a tube or film which contains not more than about 45% solvent by weight of dry cellulose;
   b) maintaining the temperature of the aqueous first bath between 0 and 10° C. and the solvent concentration between 10 and 20% during the course of extracting solvent from the extruded solution;
   c) subjecting the cellulose gel to countercurrent washing with demineralized water, the temperature of the water where it is first contacted by the cellulose gel being 12 to 16° C. and the temperature being 35 to 50° C. where it is last contacted by the cellulose gel and continuing said countercurrent washing for a time sufficient to reduce the solvent content of the cellulose gel to 1000 to 2000 ppm based on the weight of dry cellulose;
   d) subjecting the cellulose gel from said first washing to a second washing with water at a temperature higher than the highest temperature of said countercurrent washing; and
   e) treating the demineralized water from said first washing to recover solvent washed from the cellulose gel.

11. A method as in claim 10 wherein said second washing is at a temperature of at least 60° C.

12. A method as in claim 10 comprising drying the cellulose gel after said second washing, said second washing and drying together providing a cellulose film having a solvent content less than 40 ppm based on the weight of dry cellulose.

13. A method as in claim 12 wherein said drying provides said cellulose film with a moisture content of about 6% based on the weight of dry cellulose.

14. A method as in claim 10 comprising:
   a) extruding the solution at a speed of at least 30 meters per minute;
   b) maintaining the extruded solution in contact with the aqueous first bath for at least twenty seconds to precipitate the cellulose gel;
   c) subjecting the cellulose gel to said countercurrent washing for at least 2½ minutes;
   d) drying the cellulose gel from said second washing; and
   e) subjecting the cellulose gel to said second washing for at a time sufficient to reduce the total solvent content of said cellulose gel to a level such that upon said drying, a dry cellulose film is formed having a solvent content of less than 40 ppm based on the weight of dry cellulose and a moisture content of at least 6% by weight of dry cellulose.

* * * * *